United States Patent
Dixon et al.

(10) Patent No.: US 7,946,009 B2
(45) Date of Patent: May 24, 2011

(54) PEENING METHOD FOR VEHICLE SUSPENSION SPRING

(75) Inventors: Jeffrey Paul Dixon, Oakville (CA); James Hall, Burlington (CA); Ryan Versluis, Fergus (CA); Joseph A. Fader, Brighton, MI (US); Francois-Xavier Abadie, Bedarrides (FR)

(73) Assignees: MSSC US, Troy, MI (US); Saint-Gobain Centre de Recherche Et d'Etudes Europeen, Cavillion Cedex (FR)

( * ) Notice: Subject to any disclaimer, the term of this patent is extended or adjusted under 35 U.S.C. 154(b) by 1071 days.

(21) Appl. No.: 11/736,205

(22) Filed: Apr. 17, 2007

(65) Prior Publication Data

US 2008/0258367 A1  Oct. 23, 2008

(51) Int. Cl.
*C21D 7/06* (2006.01)
*B23P 17/00* (2006.01)

(52) U.S. Cl. ............... 29/90.7; 29/896.91; 72/53
(58) Field of Classification Search .......... 29/90.7, 29/896.91; 72/53
See application file for complete search history.

(56) References Cited

U.S. PATENT DOCUMENTS

| | | | |
|---|---|---|---|
| 2,249,677 A * | 7/1941 | Wallace | 72/53 |
| 3,073,022 A * | 1/1963 | Bush et al. | 72/53 |
| 4,492,102 A * | 1/1985 | Lienert | 72/53 |
| 4,599,879 A * | 7/1986 | Lienert | 72/53 |
| 4,604,881 A * | 8/1986 | Lienert | 72/53 |
| 4,848,123 A * | 7/1989 | Thompson | 72/53 |
| 5,409,415 A | 4/1995 | Kawanami et al. | |
| 6,027,577 A * | 2/2000 | Mikura et al. | 148/226 |
| 6,058,584 A * | 5/2000 | Matsuyama et al. | 29/90.7 |
| 6,346,157 B1 | 2/2002 | Takezawa et al. | |
| 6,544,360 B1 * | 4/2003 | Tange et al. | 148/580 |
| 6,694,789 B2 * | 2/2004 | Yamamoto et al. | 72/53 |
| 6,874,214 B1 * | 4/2005 | Fader et al. | 29/90.7 |
| 2002/0170327 A1 * | 11/2002 | Yamamoto et al. | 72/53 |
| 2008/0107369 A1 * | 5/2008 | Fujita et al. | 384/463 |
| 2008/0258367 A1 * | 10/2008 | Dixon et al. | 267/286 |

FOREIGN PATENT DOCUMENTS

| | | |
|---|---|---|
| EP | 1201773 | 5/2002 |
| JP | 60096717 | 5/1985 |
| JP | 06158158 | 6/1994 |
| JP | 2002030344 | 1/2002 |
| JP | 2002-205270 | 7/2002 |
| WO | 02096602 | 12/2002 |
| WO | WO 2006077682 A1 * | 7/2006 |

OTHER PUBLICATIONS

International Search Report and Written Opinion dated Dec. 17, 2008.
JP 2002205270 reference previously cited.

* cited by examiner

*Primary Examiner* — Jermie E Cozart
(74) *Attorney, Agent, or Firm* — Carlson, Gaskey & Olds

(57) ABSTRACT

A method of manufacturing a vehicle suspension component, such as a helical coil spring, includes the step of rotating a first impeller to project ceramic peening media in a first direction toward the vehicle suspension component to peen a surface section of the vehicle suspension component. In one example, the vehicle suspension component is peened with metal peening media before peening with the ceramic peening media.

20 Claims, 2 Drawing Sheets

PEENING METHOD FOR VEHICLE SUSPENSION SPRING

BACKGROUND OF THE INVENTION

This invention relates to shot peening and, more particularly, to shot peening a vehicle suspension component using ceramic peening media to increase fatigue properties of the suspension component.

Suspension components, such as coil springs, stabilizer bars, torsion bars, and the like, have considerable fatigue resistance to withstand repeated cycles of mechanical stress. For example, coil springs are manufactured from steel rods by heating and forming the rods into the desired coil shape. The coil springs are then heat treated and shot peened with steel particles to increase the fatigue resistance. The steel particles impact the surface of the coil spring, thereby compressing the surface and creating a residual compressive surface stress that offsets mechanical tensile stresses to resist fatigue.

Although using steel particles is effective for increasing resistance to fatigue, there are opportunities for improvement. For example, one problem related to the use of steel particles is that the steel particles wear the peening equipment at a rather quick rate. Depending on the frequency of use, portions of the peening equipment may require replacement over relatively short time intervals, which increase operating expenses.

Additionally, the level of fatigue resistance that is attainable using steel particles is limited. For example, using larger diameter steel particles would produce a greater amount of residual compressive surface stress. However, the gain in fatigue resistance from the greater residual compressive surface stress is offset by an increase in surface roughness due to impact with the larger diameter steel particles. Thus, steel particles have limited effectiveness for improving fatigue resistance.

Therefore, there is a need for a peening method that provides less wear on the peening equipment and produces suspension components having enhanced fatigue resistance. The disclosed examples address this need while avoiding the shortcomings and drawbacks of the prior art.

SUMMARY OF THE INVENTION

An example method of manufacturing a vehicle suspension component, such as a helical coil spring, includes the step of rotating a first impeller to project ceramic peening media in a first direction toward the suspension component to peen a surface section of the suspension component and thereby increase a fatigue resistance of the suspension component.

In one example, the vehicle suspension component is peened with metal or ceramic peening media having a first average size, followed by peening with ceramic peening media having a second average size that is smaller than the first average size. The first peening media compresses the surfaces of the automotive suspension component to provide deep residual compressive surface stress, and the second ceramic peening media smoothes those surfaces to provide a desirable surface roughness while also increasing residual surface stress. The ceramic peening media also produces less wear on the peening equipment. The combination of the first stage peening to obtain deep residual compressive stress and the second stage ceramic peening to obtain low surface roughness and high residual surface stress provides an increase in the fatigue resistance.

The disclosed examples thereby provide less wear and suspension components having enhanced fatigue resistance.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
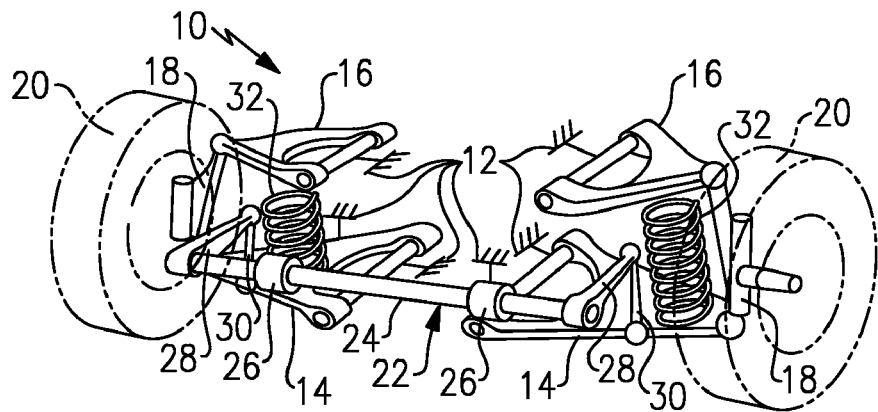
FIG. 1 is a perspective view of a vehicle suspension system.

FIG. 1 illustrates selected portions of an example vehicle suspension system 10, such as a suspension system of an automobile. The suspension system 10 includes a frame 12 that supports lower control arms 14 and upper control arms 16. A knuckle 18 is secured between each respective lower control arm 14 and upper control arm 16, and each knuckle 18 supports a wheel end 20. Although a four-bar suspension arrangement is shown, it is to be understood that the present invention may be utilized with any suspension arrangement for various types of vehicles.

A stabilizer bar 22 is arranged laterally between the lower control arms 14. The stabilizer bar 22 includes a lateral bar portion 24 supported on the frame 12 by brackets 26. The stabilizer bar 22 also includes arms 28 that are secured to the lower control arms 14 by stabilizer bar links 30. The stabilizer bar links 30 transmit vertical inputs from the lower control arm 14 and the upper control arm 16 to the stabilizer bar 22 to provide vehicle stability during roll conditions. A coil spring 32 is located between the lower control arm 14 and the frame 12 on each side of the vehicle suspension system 10 for absorbing vibration and impact transferred through the wheel ends 20. Given this description, one of ordinary skill in the art will recognize that other types of coil springs having different designs, coil thicknesses and coil diameters than the coil springs 32 may alternatively be used.

The coil springs 32 are manufactured from a steel rod using known forming and heat treatment processes, for example. The coil springs 32 of the disclosed embodiment are peened using a peening process to increase a fatigue resistance of the coil springs 32. The peened coil springs 32 have a surface hardness of about 46-57 on the Rockwell Hardness C-scale (HRC). The hardness provides the benefit of resisting wear and abrasion, while maintaining a desirable level of toughness.

Figure 2:
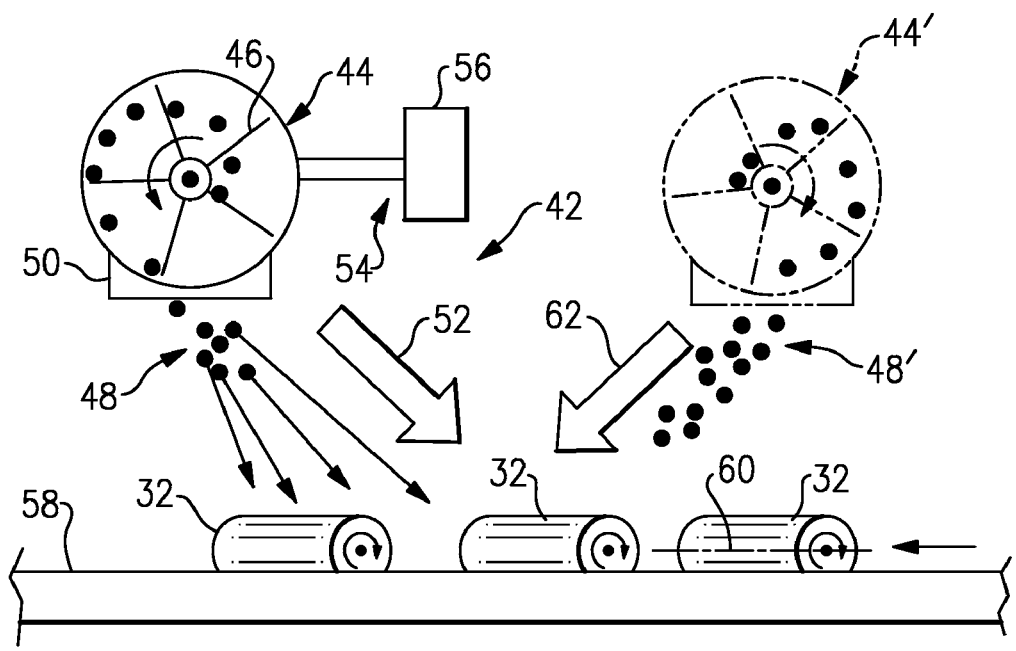
FIG. 2 is a schematic view of an example peening device utilizing one or more blast wheels.

FIG. 2 illustrates an example of the peening process. In this example, the peening process utilizes a peening device 42 that includes a blast wheel 44 having impellers 46. The impellers 46 are driven to rotate at a preset rotational velocity and thereby project ceramic peening media 48 at a corresponding projection velocity and projection rate through an opening 50 in a nominal direction 52. For example, the nominal direction 52 refers to an average or preset direction, and a portion of the ceramic peening media 48 may deviate within a tolerance of the nominal direction 52. In one example, the projection velocity is greater than 50 m/s (meters per second) and the projection rate is between 40 kg/min (kilograms per minute) and 200 kg/min to produce a desirable level of fatigue resistance. In a further example, the projection velocity is between 60 m/s and 80 m/s to produce a desirable level of fatigue resistance.

A supply arrangement 54 supplies the ceramic peening media 48, such as beads or particles, from a storage reservoir 56 to the blast wheel 44. The ceramic peening media 48 is manufactured from a known ceramic material, such as zirconium silicate, zirconium dioxide, silicon oxide, silicon carbide, aluminum oxide, other known inorganic non-metallic material, or a combination thereof. In a further example, the ceramic peening media 48 is ZIRSHOT® ceramic beads, available from Saint-Gobain.

A conveyer 58 transports the coil springs 32 (shown schematically) through the peening device 42 such that the projected ceramic peening media 48 impacts surfaces of the coil springs 32 to provide a residual compressive stress at surfaces of the coil springs 32. In the illustrated example, the conveyor 58 rotates the coil springs 32 about longitudinal axis 60 to provide uniform peening of the surfaces of the coil springs 32. Although the disclosed examples pertain to the coil springs 32, it is to be understood that other components within the vehicle suspension system 10 may likewise be peened to increase fatigue resistance.

Using the ceramic peening media 48 provides the benefit of increased fatigue resistance compared to previous peening processes that do not utilize ceramic media. For example, the ceramic peening media 48 has an average particle size of about 150-230 micrometers. Preferably, the average particle size is about 210 micrometers. The relatively small size compared to metal peening media provides a surface roughness on the coil springs after peening that is less than about 0.025 micrometers. In one example, the surface roughness of the coil springs 32 is about 0.015-0.021 micrometers. The term "about" as used in this description to describe roughness refers to normal variability associated with measuring roughness.

Figure 3:
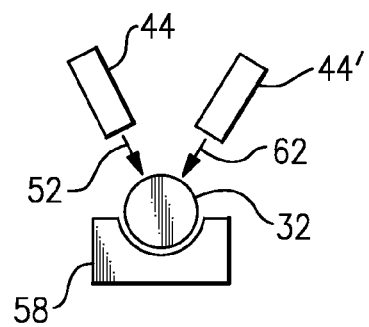
FIG. 3 is a schematic view of another peening device in which the blast wheels are laterally angled.

Optionally, a second blast wheel 44' that is similar to the first blast wheel 44 is used to project ceramic peening media 48' in nominal direction 62, which is transverse to direction 52, for example. The second blast wheel 44' may be located before or after the first blast wheel 44 relative to the movement of the conveyor 58. Each of the blast wheels 44, 44' may be vertically oriented directly above the conveyor 58 as in the illustrated example, or angled laterally as illustrated in FIG. 3. Combinations of vertical and lateral orientations are also contemplated.

Using the blast wheels 44, 44' and different directions 52, 62 provides the benefit of uniformly peening all of the surfaces of the coil springs 32. Given that peening is a "line of sight" process, using the different directions 52, 62 permits the ceramic peening media 48 to access all of the surface portions of a given coil spring 32. Given this description, one of ordinary skill in the art will recognize that one or more additional blast wheels may be used in conjunction with blast wheels 44, 44', depending on the design needs of a particular coil spring 32.

Figure 4:
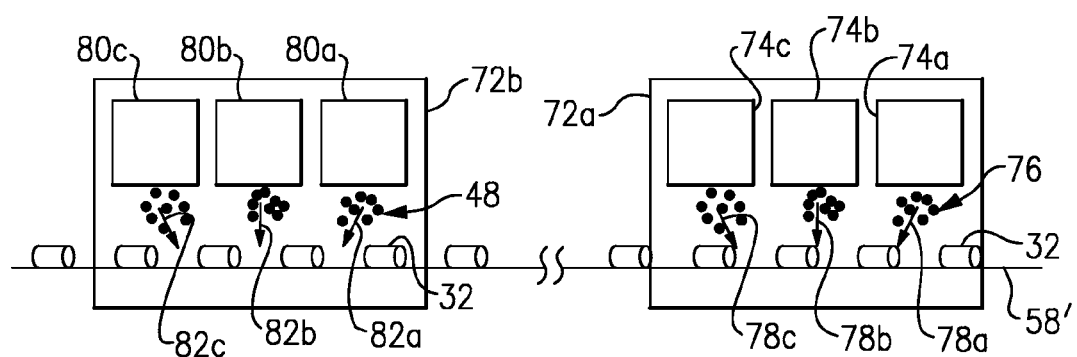
FIG. 4 is a schematic view of a duplex peening process.

FIG. 4 illustrates an example duplex peening process that includes two peening devices 72a, 72b that are similar to the peening device 42 described above. The first peening device 72a corresponds to a first peening stage and the second peening device corresponds to a second peening stage. In this example, the first peening device 72a includes three blast wheels 74a, 74b, and 74c (shown schematically) that project metal peening media 76, such as steel media, in corresponding nominal directions 78a, 78b, and 78c. A conveyor 58' transports the coil springs 32 (shown schematically) through the first peening device 72a such that projected metal peening media 76 impacts the coil springs 32 to provide a residual compressive stress at surfaces of the coil springs 32. The conveyor 58' rotates the coil springs 32 as described above.

The metal peening media 76 has an average particle size of about 560-600 micrometers. Preferably, the average particle size is about 584 micrometers. The relatively large size of the metal peening media 76 compresses the surfaces of the coil springs 32 to provide a residual compressive surface stress of $S_1$ and a surface roughness after peening that is greater than about 0.025 micrometers, up to 0.031 micrometers, for example. Given this description, one of ordinary skill in the art will recognize that other sizes of the metal peening media 76, or other peening media, may alternatively be used to provide different residual compressive surface stresses and different surface roughnesses in the first stage of peening.

After peening the coil springs 32 using the first peening device 72a, the conveyor 58' transports the coil springs 32 to the second peening device 72b. The second peening device 72b includes three blast wheels 82a, 82b, and 82c (shown schematically) that project ceramic peening media 48 in corresponding nominal directions 78a, 78b, and 78c such that the projected ceramic peening media 48 impacts the coil springs 32. The conveyor 58' rotates the coil springs 32 as described above. Optionally, the metal peening media 76 of the first stage and the ceramic peening media 48 of the second stage are collected after a given peening cycle, filtered to remove fines, and reused in a subsequent peening cycle.

As described above, the ceramic peening media 48 has an average particle size of about 150-230 micrometers, and preferably about 210 micrometers. In this example, the metal peening media 76 of the first stage has already compressed the surfaces of the coil springs 32. In the second stage, the ceramic peening media 48 provides additional compression. In addition, the smaller, ceramic peening media 48 smoothes the surfaces of the coil springs 32 and provides a surface roughness that is about 0.015-0.021 micrometers.

In the disclosed example, using a combination of the metal peening media 76 in the first stage to obtain deep residual compressive stress and the ceramic peening media 48 in the second stage to obtain high residual surface stress and low surface roughness provides the synergistic benefit of significantly increasing the fatigue resistance of the coil springs 32. In one example, the synergistic benefit is achieved by using approximately equal projection velocities in the first and second stages. That is, the ceramic peening media 48 is projected with a velocity that is within about +/−20 m/s of the velocity of the metal peening media 78. In a further example, the projection velocities are between 60 m/s and 80 m/s to produce a desirable level of fatigue resistance.

Additionally, using the ceramic peening media 48 provides the benefit of reducing abrasive wear on the peening equipment compared to using metal peening media. The ceramic peening media 48 is smaller and less dense than a metal media, and therefore impacts the blast wheels 44, 82a, 82b, and 82c, conveyor 58', and other components with less energy for a given projection velocity. This reduces the rate of abrasive wear and extends the useful life of the impellers, conveyor 58', and other components. Further, the ceramic peening media 48 extends the life and reduces surface discontinuities and damage on the blast wheels 44, 82a, 82b, and 82c (wear due to abrasion), resulting in improved blasting performance over the time an individual impeller is used. In use, cast metal impellers stay much smoother, resulting in less "splaying" of the ceramic peening media 48 off the impellers in a random fashion as the blast wheels 44, 82a, 82b, and 82c rotate. Thus, a greater amount of the ceramic peening media

48 will leave the tip of the impeller in the desired/theoretical projection direction and with the desired velocity, which results in improved peening.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of manufacturing a vehicle suspension component, comprising:
   (a) rotating a first impeller to project ceramic peening media, at a projection velocity between 60 m/s and 80 m/s, in a first direction toward the vehicle suspension component to peen a surface section of the vehicle suspension component.

2. The method as recited in claim 1, further comprising:
   (b) rotating a second impeller to project additional ceramic peening media in a second direction toward the vehicle suspension component, wherein the second direction is different than the first direction.

3. The method as recited in claim 1, wherein the vehicle suspension component comprises a helical coil having a longitudinal axis, and further comprising rotating the helical coil about the longitudinal axis.

4. The method as recited in claim 1, further comprising:
   (b) peening the surface section of the vehicle suspension component with the ceramic peening media to produce a surface roughness of the vehicle suspension component that is less than 0.025 micrometers.

5. The method as recited in claim 1, further comprising:
   (b) peening the surface section of the vehicle suspension component with the ceramic peening media to produce a surface roughness of the vehicle suspension component that is about 0.015-0.021 micrometers.

6. The method as recited in claim 1, further comprising:
   (b) peening the vehicle suspension component with metal peening media before said step (a).

7. The method as recited in claim 6, further comprising:
   (c) peening with a first average size of the metal peening media and peening with a second average size of the ceramic peening media that is different than the first average size.

8. The method as recited in claim 6, further comprising:
   (c) peening with a first average size of the metal peening media and peening with a second average size of the ceramic peening media that is less than the first average size.

9. The method as recited in claim 6, wherein the ceramic peening media has an average size of about 150-230 micrometers, and the metal peening media has an average size of about 560-600 micrometers.

10. The method as recited in claim 6, wherein the ceramic peening media has an average size of about 210 micrometers, and the metal peening media has an average size of about 584 micrometers.

11. The method as recited in claim 1, further comprising:
    projecting the ceramic peening media at a rate between 40 kg/min and 200 kg/min.

12. The method as recited in claim 1, further comprising:
    selecting the ceramic peening media to reduce an amount of wear on the first impeller relative to using metal peening media.

13. The method as recited in claim 1, wherein said ceramic peening media is aluminum oxide ($Al_3O_2$).

14. The method as recited in claim 1, further comprising the steps of:
    peening with a first average size of the metal peening media and peening with a second average size of the ceramic peening media that is less than the first average size; and
    projecting the ceramic peening media at a rate between 40 kg/min and 200 kg/min.

15. A method of manufacturing a vehicle suspension component, comprising:
    (a) peening the vehicle suspension component using metal peening media and a first projection velocity between 60 m/s and 80 m/s; and
    (b) peening the vehicle suspension component using ceramic peening media and a second projection velocity after said step (a) to establish a desired level of fatigue resistance, wherein the second projection velocity is between 60 m/s and 80 m/s.

16. The method as recited in claim 15, further comprising:
    (c) producing a residual compressive stress at a surface section of the vehicle suspension component by peening the vehicle suspension component with the metal peening media followed by increasing the residual compressive stress at the surface section by peening the vehicle suspension component with the ceramic peening media.

17. The method as recited in claim 15, further comprising:
    (c) selecting a first average size for the metal peening media and selecting a second average size for the ceramic peening media that is different than the first average size.

18. The method as recited in claim 15, further comprising:
    (c) selecting a first average size for the metal peening media and selecting a second average size for the ceramic peening media that is less than the first average size.

19. The method as recited in claim 15, further comprising:
    (c) rotating a plurality of impellers to project the ceramic peening media toward the vehicle suspension component.

20. The method as recited in claim 15, wherein said ceramic peening media is aluminum oxide ($Al_3O_2$).

* * * * *